ate of Patent: Sep. 26, 1989

United States Patent [19]
Chen

[11] Patent Number: 4,870,299
[45] Date of Patent: Sep. 26, 1989

[54] DYNAMIC SWITCHING CIRCUIT FOR MULTIPLE ASYNCHRONOUS CLOCK SOURCES

[76] Inventor: Ben W. Chen, 40939 Camero Pl., Fremont, Calif. 94539

[21] Appl. No.: 172,791

[22] Filed: Mar. 28, 1988

[51] Int. Cl.$^4$ .................. H03K 3/013; H03K 5/26
[52] U.S. Cl. ..................... 307/269; 307/247.1; 331/55; 331/56; 328/71; 328/72; 328/154
[58] Field of Search ............... 307/269, 247.1; 328/154, 158, 71, 72; 331/55, 56

[56] References Cited
U.S. PATENT DOCUMENTS 4,001,701 1/1977 Rosso et al. .................. 328/158
4,419,629 12/1983 O'Brien .......................... 307/269
4,570,082 2/1986 Maley ............................ 307/269

Primary Examiner—John S. Heyman
Attorney, Agent, or Firm—Fliesler, Dubb, Meyer & Lovejoy

[57] ABSTRACT

A dynamic switching circuit for multiple asynchronous clock sources comprising a pair of flip-flops which are set and reset in such a manner as to provide high frequency and low frequency output clock pulses without a glitch and within a period extending from approximately a few nanoseconds to no greater than a period equal to the sum of the periods of one of said high and low frequency clock pulses.

10 Claims, 3 Drawing Sheets

High — To — Low

DYNAMIC SWITCHING CIRCUIT FOR MULTIPLE ASYNCHRONOUS CLOCK SOURCES

BACKGROUND OF THE INVENTION

1. Field of the Invention

The present invention relates in general to apparatus for providing clock signals in a computer and in particular to an apparatus for dynamically switching between multiple clock sources.

2. Description of the Prior Art

High and low frequency clock sources are used in computer systems to take full advantage of the high speed operation of current microprocessors, on-board memories and the like and the low speed operation of off-board memories and other peripheral devices such as input/output devices.

The switching circuits used for switching between high and low frequency clock sources are either synchronous or asynchronous and heretofore both have been found to have certain disadvantages. For example, a disadvantage of prior known asynchronous clock switching circuits is that the circuits usually introduce "glitches", i.e. unwanted spikes, in the clock output or unwanted losses of clock pulses when the circuit switches between high and low frequency clock sources. Such effects create instability in the computer or violate microprocessor (CPU) specifications. On the other hand, the use of synchronous switching circuits requires the switching to be synchronized to an external clock source. In practice, that results in the switching time taking longer to complete, requires additional overhad and prevents expedient use of dynamic switching, i.e. switching from machine cycle to machine cycle.

In order to achieve compatibility in terms of software and hardware timing, several approaches have been used in the past.

In one approach, clock switching has been limited to switching between clock sources wherein the frequency of the high clock is twice the frequency of the low clock, e.g. 16 mHz/8 mHz, 12 mHz/6 mHz or 10 mHz/5 mHz. In this way, the circuit design of the state machine is simplified, but the performance is poor, especially in the low speed mode.

In another approach relatively complicated state machines have been used to accommodate both high and low speeds but unwanted wait states are typically required. For example, in the IBM AT design using 16 mHz/8 mHz, two state machines are used. In a memory cycle involving a given memory, for instance, the 8 mHz mode will generate 1 wait state while the 16 mHz mode will generate 4 wait states.

In a computer system which uses a high clock frequency which is not twice the low clock frequency, compatibility is even more difficult to achieve. For example, in a computer system using 12 mHz and 8 mHz clock sources, the 12 mHz mode will require 2.5 wait states to maintain compatibility with the 8 mHz clock. Since fractional wait states are not possible, conventional state machines in such systems cannot provide exact compatibility. Moreover, a different design for the state machines would be required in such systems for each different set of multiple clock sources, e.g. 20 mHz/8 mHz, 16 mHz/8 mHz or 12 mHz/8 mHz, if performance is not to be sacrificed.

SUMMARY OF THE INVENTION

In view of the foregoing, a principal object of the present invention is a dynamic switching circuit for switching multiple asynchronous clock sources which can be used in a variety of computer systems. For example, the circuits can be used in various models of the IBM AT to switch 10 mHz/6 mHz, 10 mHz/8 mHz, 12 mHz/6 mHz, 12 mHz/8 mHz and 16 mHz/8 mHz sources. It can be used in the IBM PS/2 Models 50 and 60 to switch 12 mHz/10 mHz and 16 mHz/10 mHz sources. It can also be used in the IBM PS/2, Model 80 to switch 25 mHz/16 mHz sources.

In addition to handling multiple clock sources wherein the frequency of the high frequency clock is not necessarily twice the frequency of the low frequency clock, the switching circuit of the present invention provides a glitch-free output and requires no more than the sum of the durations of one clock pulse at said high and low frequencies to switch between the high and low clock sources in the worst case. In the best case the switching can take place within a period as small as a few nanoseconds.

Another feature of the switching circuit of the present invention is a means responsive to system requirements for automatically switching between the high and low frequency clock sources. For example, if the operator selects high speed operation and in the course of executing a program the computer system accesses a low speed device, such as an input/output device, the selection of the low speed device will automatically cause the switching circuit to output the low frequency clock. When the access to the low speed device is terminated, the switching circuit automatically returns to providing the high frequency clock.

BRIEF DESCRIPTION OF THE DRAWINGS

The above and other objects, features and advantages of the present invention will become apparent from the following detailed description of the accompanying drawing, in which.

DETAILED DESCRIPTION OF THE DRAWING

Figure 1:
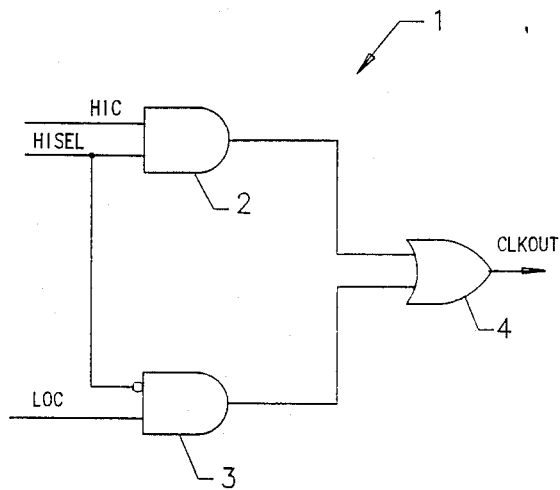
FIG. 1 is a prior art circuit for switching multiple asynchronous clock sources.

Referring to FIG. 1, there is provided in a prior art switching circuit designated generally as 1 for switching multiple asynchronous clock sources, a plurality of AND gates 2, 3 and 4. One input of AND gate 2 is coupled to a source of high frequency clock signals HIC. A second input of AND gate 2 is coupled to a source of a control signal HISEL. A first inverted input of AND gate 3 is coupled to the source of control signal HISEL and a second input of AND gate 3 is coupled to a source of low frequency clock signals LOC. The outputs of AND gates 2 and 3 are coupled to inputs of an OR gate 4. OR gate 4 is provided with an output for providing clock signals CLKOUT.

Figure 2:
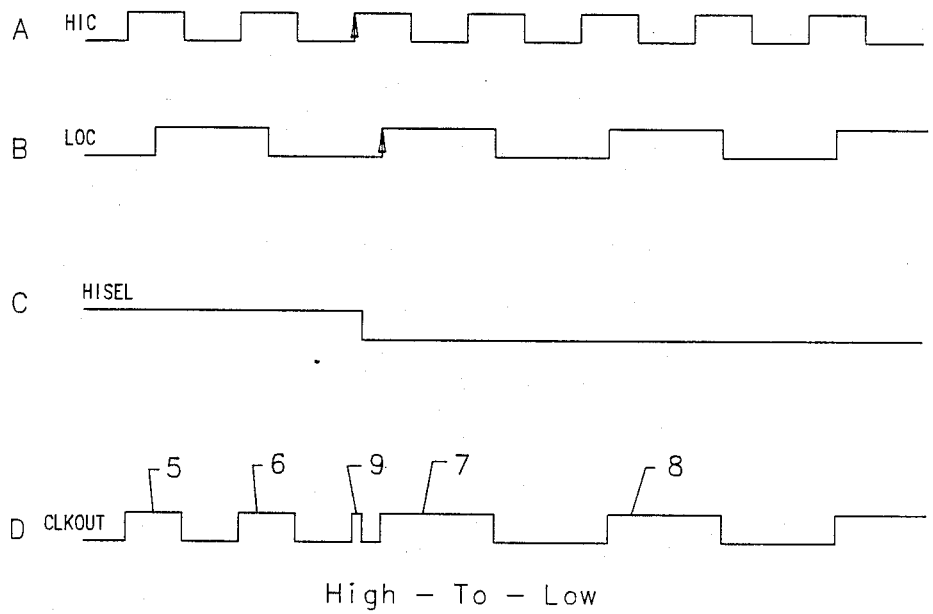
FIGS. 2A-2D are diagrams of waveforms of clock and control signals in the circuit of FIG. 1.

Referring to FIG. 2, when control signal HISEL is high as shown in waveform C, AND gate 2 is enabled and high frequency clock signals HIC appear on the output of the OR circuit 4 as clock signals CLKOUT as shown by pulses 5 and 6 in waveform D. When control signal HISEL goes low, AND gate 2 is disabled, AND gate 3 is enabled and low frequency clock signals LOC as shown in waveform B appear on the output of OR gate 4 as low frequency pulses 7 and 8.

As shown in waveform D, a glitch in the form of a narrow pulse 9 appears between high frequency pulse 6 and low frequency pulse 7. This glitch occurs when the control signal HISEL goes from a high to a low at a time which is not coincident with the leading edge of a low frequency pulse. Conversely, the same type of glitch will occur when the control signal HISEL goes from a low to a high at a time which is not coincident with the leading edge of a high frequency pulse. As discussed above, such glitches create instability in the computer or violate microprocessor (CPU) specifications.

Figure 3:
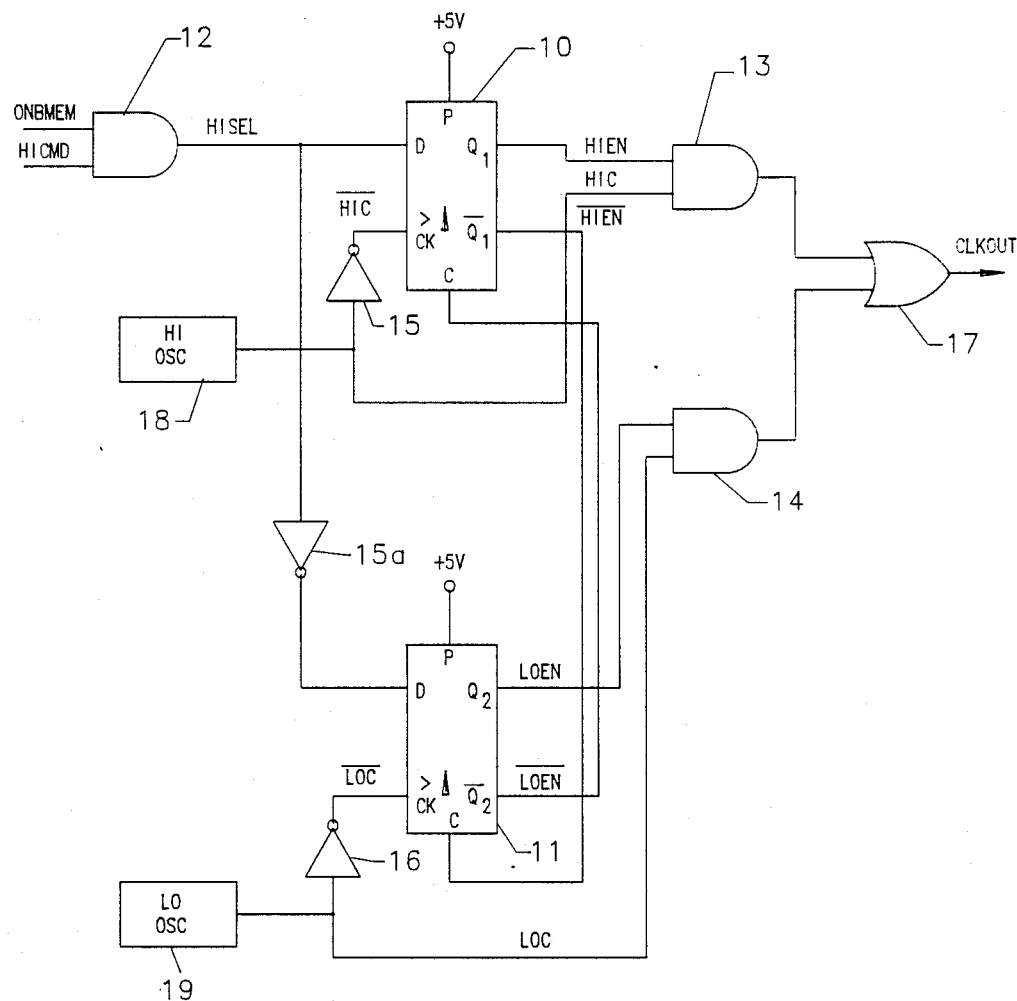
FIG. 3 is a block diagram of a dynamic switching circuit for multiple asynchronous clock sources according to the present invention.

Referring to FIG. 3, there is provided in accordance with the present invention a pair of D flip-flops 10 and 11, a plurality of AND gates 12, 13 and 14, a plurality of inverters 15, 15a and 16, an OR gate 17, a high frequency clock source 18 and a low frequency clock source 19. Each of the flip-flops 10 and 11 is provided with a control signal input D, a preset input P, a clear input C and a clock input CK. Flip-flop 10 is further provided with a pair of complementary outputs $Q_1$ and $\overline{Q_1}$. Flip-flop 11 is provided with a pair of complementary outputs $Q_2$ and $\overline{Q_2}$. The AND gate 12 is provided with a pair of control signal inputs ONBMEM and HICMD for providing an output HISEL. The output of the AND gate 12 is coupled to the D input of the flip-flop 10 and through inverter 15a to the D input of flip-flop 11. The output of the high frequency oscillator 18 is coupled to the clock input of the flip-flop 10 through the inverter 15 and to one of the inputs of the AND gate 13. The output of the high frequency oscillator 18 is shown as HIC. The output of the inverter 18 is shown as $\overline{HIC}$. The true output $Q_1$ of flip-flop 10 which is shown as HIEN is coupled to a second input of the AND gate 13. The complementary output $\overline{Q_1}$ of flip-flop 10 is coupled to the clear input C of flip-flop 11. The output of the low frequency oscillator 19 which is designated LOC is coupled to one input of AND gate 14 and through the inverter 16 to the clock input of the flip-flop 11. The output of the inverter 16 is designated $\overline{LOC}$. The true output $Q_2$ of flip-flop 11 designated LOEN is coupled to a second input of the AND gate 14. The complementary output $\overline{Q_2}$ of flip-flop 11 designated $\overline{LOEN}$ is coupled to the clear input C of the flip-flop 10. The preset inputs P of flip-flops 10 and 11 are coupled to a source of a high potential, e.g. +5 v. The outputs of AND gates 13 and 14 are coupled to OR gate 17. The clock output of OR gate 17 is designated CLKOUT.

The operation of the flip-flops 10 and 11 is conventional. When the preset input P is low, the true output Q will be high and the complementary output $\overline{Q}$ will be low regardless of the potentials applied to the inputs D and CLK. When the clear input C is low the true output Q will be low and the complementary output $\overline{Q}$ will be high regardless of the potential applied to the inputs D and CLK. When both P and C are low, both Q and $\overline{Q}$ will be high. At other times the output Q will follow the input D on the leading edge of a clock pulse CLK applied to the input CK.

Figure 4:
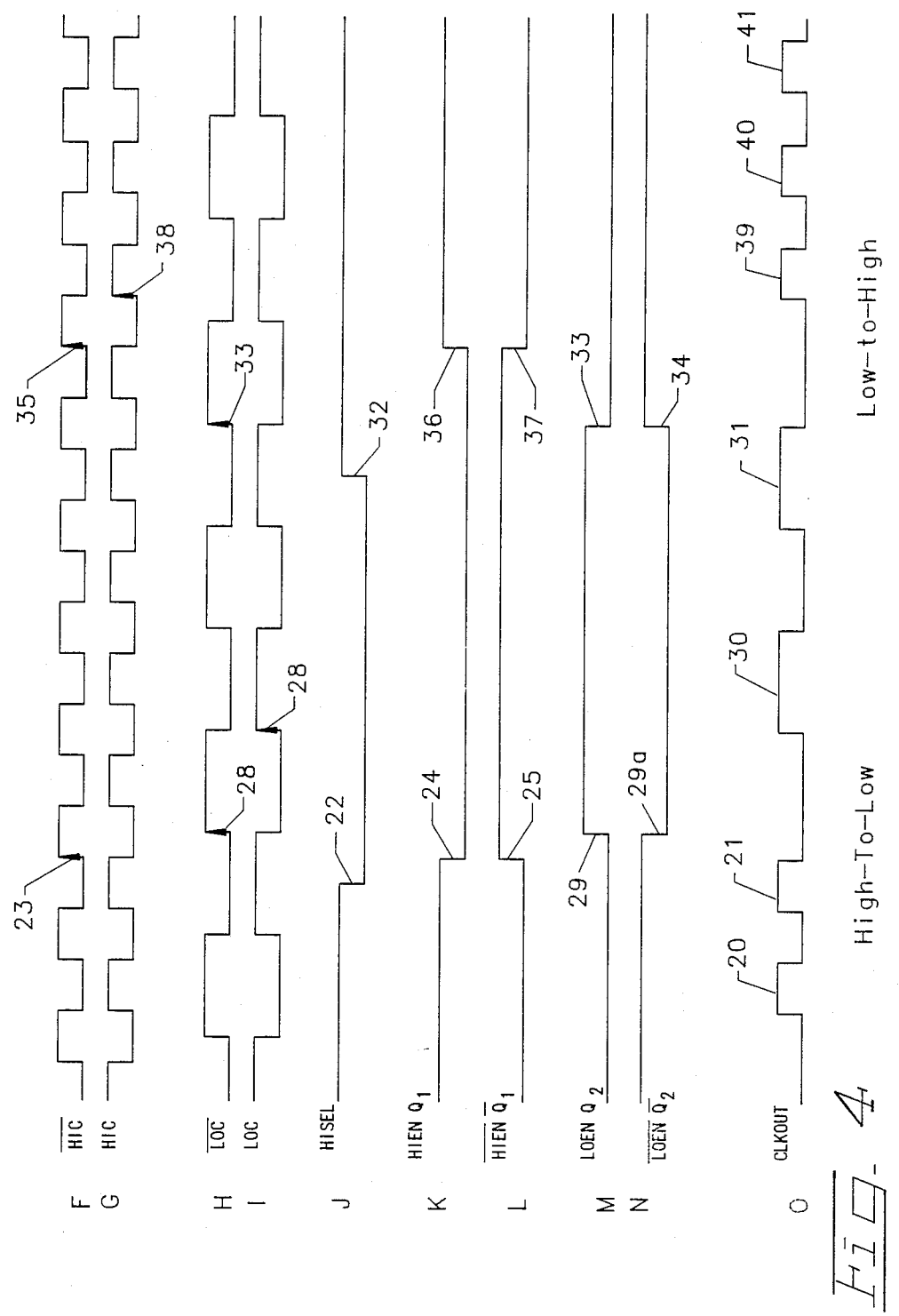
FIGS. 4F-O are diagrams of waveforms of clock and control signals in the circuit of FIG. 3.

Referring to FIG. 4, true and complementary high frequency clock signals HIC and $\overline{HIC}$ are shown in waveforms F and G. True and complementary low frequency clock signals LOC and $\overline{LOC}$ are shown in waveforms I and H, respectively. Control signal HISEL is shown as waveform J. The true and complementary control signals HIEN and $\overline{HIEN}$, also seen as $Q_1$ and $\overline{Q_1}$ are shown in waveforms K and L, respectively. The true and complementary control signals LOEN and $\overline{LOEN}$ are shown as $Q_2$ and $\overline{Q_2}$ in waveforms M and N, respectively. The clock output CLKOUT of OR gate 17 is shown as waveform O.

In the operation of the switching circuit of the present invention, when an operator selects the high frequency clock output, control signal HICMD will be high. If an onboard memory or other high speed apparatus is being used at the same time, the control signal ONBMEM will be high causing the output HISEL of AND gate 12 to be high, as shown in waveform J. When HISEL is high and, if at that time flip-flop 10 is set such that its true output $Q_1$ is high as shown in waveform K, AND gate 13 will be enabled, $\overline{Q_1}$ will be low causing $Q_2$ to be held low and high frequency clock pulses such as shown at 20 and 21 in waveform 0 will be produced on the output of the OR gate 17.

When either control signal HICMD or control signal ONBMEM goes low, control signal HISEL will go low as shown at 22 in waveform J. The level of control signal HICMD is controlled by an operator selecting the high or low frequency clocks. The level of control signal ONBMEM is controlled by an address decoder or the like such that when a high speed device is accessed requiring the high frequency clock, ONBMEM will be high and when a low speed device requiring the low frequency clock is accessed, ONBMEM will be low.

Thus, when HISEL goes low, on the rising edge of the first complementary high frequency clock signal as shown at 23 in waveform F, flip-flop 10 will flip causing its true output $Q_1$ to go low and its complementary output $\overline{Q_1}$ to go high as shown at 24 and 25 in waveform K and L, respectively, disabling AND gate 13. When the complementary output $\overline{Q_1}$ of flip-flop 10, and consequently the input C of flip-flop 11, goes high as shown at 25 in waveform L, flip-flop 11 is enabled to be flipped. The input D of flip-flop 11 is now high. Upon the rising edge of the next complementary low frequency clock signal $\overline{LOC}$ as shown at 28 in waveform H, flip-flop 11 is flipped, $Q_2$ goes high and $\overline{Q_2}$ goes low as shown at 29 and 29a in waveforms M and N and AND gate 14 is enabled. At the same time, $\overline{Q_2}$ and input C of flip-flop 10 being low holds $Q_1$ low and $\overline{Q_1}$ high. Thereafter, the output of OR gate 17 becomes the low frequency clock pulses as shown at 30 and 31 in waveform O. This completes the description of the operation of circuit 3 in dynamically switching from a high frequency oscillator output to the low frequency oscillator output.

If some time thereafter both control signal HICMD and control signal ONBMEM coupled to the input of AND gate 12 are driven high, the output control signal HISEL from AND gate 12 will be driven high as shown at 32 in waveform J. Thereafter, upon the rising edge of the first complementary low frequency clock signal $\overline{LOC}$ as shown at 33 in waveform H, flip-flop 11 will flip driving the true output $Q_2$ low and the complementary output $\overline{Q_2}$ high as shown at 33 and 34 of waveforms M and N. After flip-flop 11 has flipped, upon the leading edge of the next complementary high frequency clock pulse $\overline{HIC}$ as shown at 35 in waveform F, flip-flop 10 is flipped such that the true output $Q_1$ is driven high and the complementary output $\overline{Q}_1$ is driven low as shown at 36 and 37 in waveforms K and L, respectively. After flip-flop 10 is flipped enabling AND gate 13, upon the rising edge of the next true high frequency clock pulse HIC as shown at 38 in waveform G, high frequency clock pulses are provided on the output of the OR gate 17 as shown at 39, 40, 41 of waveform O.

While a preferred embodiment of the present invention is described above, it is contemplated that various modifications may be made thereto without departing from the spirit and scope of the present invention. Accordingly, it is intended that the embodiment described be considered only as an illustration of the present invention and that the scope thereof should not be limited thereto but be determined by reference to the claims hereinafter provided.

What is claimed is:

1. A dynamic switching circuit having an output for switching between multiple asynchronous clock sources comprising:
    first and second flip-flops, each of said flip-flops having a set state and a reset state;
    means for coupling said first flip-flop to a first source of clock pulses having a first frequency;
    means for coupling said second flip-flop to a second source of clock pulses having a second frequency;
    means for preventing the setting of either one of said first and said second flip-flop before the other of said flip-flop is reset;
    means for setting and resetting said flip-flops; and
    means coupled to said first and said second flip-flops and to said first and said second sources which is responsive to a setting of said flip-flops for providing on said output clock pulses at said first frequency when said first flip-flop is set and at said second frequency when said second flip-flop is set.

2. A dynamic switching circuit for switching between multiple asynchronous clock sources according to claim 1 wherein the time it takes for switching between said first frequency and said second frequency is a period of time which extends from approximately a few nanoseconds to no greater than a period equal to the sum of the periods of one of said clock pulses having said first frequency and one of said clock pulses having said second frequency.

3. A dynamic switching circuit for switching between multiple asynchronous clock sources comprising:
    a first and a second flip-flop circuit means, each of said flip-flop circuit means having an output which can be changed from a first level (high) to a second level (low) and from said second level (low) to said first level (high);
    means located in said first flip-flop circuit means which is responsive to a first source of clock signals (high), a control signal having a first level (high) and a second level (low) and said second flip-flop circuit means for changing said output of said first flip-flop circuit means from its first level (high) to its second level (low) when said output of said second flip-flop circuit means is at its second level (low) and said control signal is changed from its first level (high) to its second level (low);
    means located in said second flip-flop circuit means which is responsive to a second source of clock signals (low), said control signal and said first flip-flop circuit means for changing said output of said second flip-flop circuit means from its second level (low) to its first level (high) when said control signal is at its second level (low) and said output of said first flip-flop circuit means changes from its first level (high) to its second level (low);
    means located in said second flip-flop circuit means which is responsive to said second source of clock signals (low), said control signal and said first flip-flop circuit means for changing said output of said second flip-flop circuit means from its first level (high) to its second level (low) when said output of said first flip-flop circuit means is at its second level (low) and said control signal changes from its second level (low) to its first level (high);
    means located in said first flip-flop circuit means which is responsive to said first source of clock signals (high), said control signal and said second flip-flop for changing said output of said first flip-flop from its second level (low) to its first level (high) when said control signal is at its high level and said output of said second flip-flop circuit means changes from its first level (high) to its second level (low); and
    clock output means responsive to said output of said first and said second flip-flop circuit means and said first and said second sources of clock signals for providing at an output thereof said clock signals from said first source when said output of said first flip-flop circuit means is at its first level and said output of said second flip-flop circuit means is at its second level and from said second source when said output of said second flip-flop circuit means is at its first level and said output of said first flip-flop circuit means is at its second level.

4. A dynamic switching circuit for switching between multiple asynchronous clock sources according to claim 3 wherein said control signal comprises a first control signal and further comprising means responsive to a second and a third control signal for providing said first control signal.

5. A dynamic switching circuit for switching between multiple asynchronous clock sources according to claim 4 wherein said first control signal providing means comprises AND gate means.

6. A dynamic switching circuit for switching between multiple asynchronous clock sources according to claim 3 wherein said first and said second flip-flop circuit mean each comprises a D flip-flop.

7. A dynamic switching circuit for switching between multiple asynchronous clock sources according to claim 3 wherein said clock output means comprises:
    first AND gate means coupled to said output of said first flip-flop circuit means and said first source of clock signals;
    second AND gate means coupled to said output of said second flip-flop circuit means and said second source of clock signals;
    OR gate means coupled to an output of said first and said second AND gate means.

8. A dynamic switching circuit for switching between multiple asynchronous clock sources comprising:
    a first and a second D flip-flop, each of said flip-flops having a D input, a clock input, a clear input C, a preset input P, a true output and a complementary output;
    a first and second AND gate;
    an OR gate;
    means for coupling a true and complementary control signal (HISEL) to said D inputs of said first and said second flip-flops, respectively, said first control signal being settable to a high and a low state;

a source of true and complementary high frequency clock signals (HIC, $\overline{HIC}$);

means for coupling said true high frequency clock signal (HIC) to a first input of said first AND gate;

means for coupling said complementary high frequency clock signals ($\overline{HIC}$) to said clock input of said first flip-flop;

means for coupling said true output ($Q_1$) of said first flip-flop to a second input of said first AND gate;

means for coupling said complementary output ($\overline{Q_1}$) of said first flip-flop to said P input of said second flip-flop;

means for coupling said P input of said first flip-flop to a source of high potential;

a source of true and complementary low frequency clock signals (LOC, $\overline{LOC}$);

means for coupling said true low frequency clock signals (LOC) to a first input of said second AND gate;

means for coupling said complementary low frequency clock signals ($\overline{LOC}$) to said clock input of said second flip-flop;

means for coupling said complementary output ($\overline{Q_2}$) of said second flip-flop to said C input first flip-flop;

means for coupling said true output ($Q_2$) of said second flip-flop to a second input of said second AND gate;

means for coupling said C input of said second flip-flop to a source of high potential; and means for coupling said outputs of said first and said second AND gates to said OR gate such that the output of said OR gate comprises said high frequency clock signals when said control signal is high and said low frequency clock signals when said control signal is low.

9. A dynamic switching circuit having an output for switching between multiple asynchronous clock sources comprising:

first and second flip-flops, each of said flip-flops having a set state and a reset state;

a first flip-flop having means coupled to said second flip-flop which is responsive to a first control signal generated by said second flip-flop when said second flip-flop is in its set state for holding said first flip-flop in its reset state;

a second flip-flop having means coupled to said first flip-flop which is responsive to a second control signal generated by said first flip-flop when said first flip-flop is in its set state for holding said second flip-flop in its reset state; and means for selectively switching each of said first and said second flip-flop from their set state to their reset state so that neither of said flip-flops can be switched to its set state until the other one has been switched to its reset state.

10. A dynamic switching circuit according to claim 9 wherein said holding means in each of said first and said second flip-flops comprises a clear signal input.

* * * * *

UNITED STATES PATENT AND TRADEMARK OFFICE
CERTIFICATE OF CORRECTION

PATENT NO. : 4,870,299
DATED : September 26, 1989
INVENTOR(S) : BEN W. CHEN

It is certified that error appears in the above-identified patent and that said Letters Patent is hereby corrected as shown below:

Title page, item [76] "40939 Camero Pl." should be --201 Prairie Dog Lane--.

Column 3, line 41, "$Q_1$" should be --$\overline{Q_1}$--.
Column 6, line 47, "mean" should be --means--.

Signed and Sealed this

Twenty-third Day of October, 1990

Attest:

HARRY F. MANBECK, JR.

Attesting Officer     Commissioner of Patents and Trademarks